(12) United States Patent
Khanchandani

(10) Patent No.: US 8,284,923 B2
(45) Date of Patent: Oct. 9, 2012

(54) BRIDGING MESSAGES TO RELEASE ENTERPRISE PORTS

(75) Inventor: Niraj Khanchandani, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1236 days.

(21) Appl. No.: 11/519,111

(22) Filed: Sep. 11, 2006

(65) Prior Publication Data

US 2008/0075265 A1 Mar. 27, 2008

(51) Int. Cl.
*H04M 7/00* (2006.01)
(52) U.S. Cl. .................. 379/231; 379/88.13; 379/234; 379/265.09
(58) Field of Classification Search .................. 379/231, 379/234, 88.13, 265.09; 370/352, 401
See application file for complete search history.

(56) References Cited

U.S. PATENT DOCUMENTS

| | | |
|---|---|---|
| 6,584,093 B1 | 6/2003 | Salama et al. |
| 6,661,785 B1 | 12/2003 | Zhang et al. |
| 6,813,264 B2 | 11/2004 | Vassilovski |
| 6,928,070 B2 | 8/2005 | Emerson, III |
| 7,002,912 B2 | 2/2006 | Wengrovitz |
| 7,016,338 B2 | 3/2006 | Gunn et al. |
| 7,113,500 B1* | 9/2006 | Bollinger et al. ............. 370/352 |
| 2003/0043992 A1* | 3/2003 | Wengrovitz .................. 379/229 |
| 2003/0086411 A1* | 5/2003 | Vassilovski .................. 370/352 |
| 2005/0063529 A1* | 3/2005 | Meldrum et al. ........ 379/211.04 |

OTHER PUBLICATIONS

Dalgic, et al., "True Number Portability and Advanced Call Screening in a SIP-Based IP Telephony System", Date: Jul. 1999, http://ieeexplore.ieee.org/iel5/35/16821/00774887.pdf?isNumber=.
Jiang, et al., "Integrating Internet Telephony Services", Date: May-Jun. 2002, http://ieeexplore.ieee.org/iel5/4236/21649/01003133.pdf?isNumber=.
Johnston, et al., "True Number Portability and Advanced Call Screening in a SIP-Based IP Telephony System", Date: 2003, http://ieeexplore.ieee.org/iel5/35/16821/00774887.pdf?isNumber=.

* cited by examiner

*Primary Examiner* — Antim Shah

(57) ABSTRACT

Architecture for bridging unwanted calls back to the PSTN (public switch telephone network) thereby freeing-up enterprise ports for other uses. When an incoming PSTN call is received into the enterprise via the PBX, a SIP server makes the decision to trigger bridging after obtaining the call reference and the interface on which the call exists. The SIP server sends a request to the PBX to trigger bridging. When the PBX determines it no longer needs to be involved, it sends the bridging request to the PSTN. More specifically, a mechanism is provided to trigger TBCT (Two B-Channel Transfer) from the SIP server thereby pushing call routing of unwanted calls out of the PBX and preserving PBX ports. The SIP server can retrieve the PSTN-related information from the PBX using either web services or a SIP-based protocol.

16 Claims, 10 Drawing Sheets

BRIDGING MESSAGES TO RELEASE ENTERPRISE PORTS

BACKGROUND

Communications is vital for corporate business. The telephone infrastructure of many enterprise telecommunication systems employs a PBX (private branch exchange). The PBX, in part, functions similar to a network switch by routing calls internal and external to the enterprise. PBX systems provide a mechanism for reducing the TCO (total cost of ownership) related to telephone communications by requiring only a small percentage of the total number of ports to support the many different employees. In an enterprise, where a large number of calls remain internal to the company, external PSTN (public switched telephone network) connectivity can be purchased at much lower concentration, for example, at a ratio of 1:10 assuming not more than ten percent of the calls will be routed to the PSTN.

If a call comes into the enterprise from the PSTN and is determined to be an unwanted call (e.g., one that is redirected outside the enterprise), it is forwarded back to PSTN, unnecessarily consuming enterprise two ports (incoming and outgoing). Should the number of redirected enterprise calls meet or exceed the limitations of the enterprise system, the enterprise call system becomes paralyzed in that no further calls (that may have value to the company) can be processed. As the number of outgoing calls from the enterprise to the PSTN increases, however, one remedy is to purchase additional trunks as the PSTN connectivity increases, further increasing TCO. Accordingly, it is important for the company to control the number of ports actually used for external calls to the PSTN in order to preserve the TCO.

Voice-over-IP (VoIP) technology is rapidly gaining in popularity as a telecommunications mechanism, not only for conducting telephone calls over data (or IP) networks, but also based on the available services such as caller ID, voice e-mail, call waiting, call forwarding, and so on. SIP (session initiation protocol) is an emerging standard for handling IP-based telephone calls, multimedia teleconferencing, and other types of realtime IP-based communications. SIP gateways can be employed as an interface between IP and telephony networks enabling IP-communications for endpoints, PBXs, and other systems.

Prior to SIP-based VoIP infrastructures, the PBX was made aware of every phone in the enterprise. This enabled the PBX to be knowledgeable about incoming calls from the PSTN that needed to be redirected back into PSTN. This knowledge enabled the PBX to trigger TBCT (Two B-Channel Transfer), a technology that addresses PBX incoming and outgoing call port problems by placing the switching back into the telephone company system. Excessive port consumption is common in conventional VoIP implementations or where a media server is employed for media termination to account for NAT (network address translation) or TDM (time division multiplex) to VoIP conversion. Legacy TDM networks resolved this issue by requesting bridging via TBCT which sends a Q.931 Facility message to bridge the calls on the PSTN carrier switch.

With the increasing adoption of SIP-based telecommunications in combination with PBX systems, and with the SIP server being external to the PBX, the PBX loses control of TBCT triggering, thereby increasing port usage by a factor of two for every call forwarded to the external PSTN.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates more efficient port usage in an enterprise telephone IP-based (e.g., VoIP) system that includes a PBX (private branch exchange) by bridging (or routing) unwanted calls out of the enterprise call system back to the PSTN (public switch telephone network) thereby freeing up originally allocated PBX ports for other uses.

A SIP server is employed that makes the decision to trigger bridging, but only after obtaining the call knowledge (e.g., call IDs) needed to help the PSTN to bridge the call. The SIP server communicates with the PBX to retrieve PSTN-related information about the call (e.g., the call IDs assigned to the incoming call and the outgoing call), processes the information, and sends a request to the PBX. The PBX forwards this request to the PSTN to trigger bridging of the calls back into the PSTN according to the call IDs. The SIP server can retrieve the PSTN-related information from the PBX using in-band means such as web server and a SIP-based protocol (e.g., a SIP INFO message), and via an out-of-band channel by communicating directly between the SIP server and PBX gateway (e.g., using Signaling System 7 (SS7), web services)) rather than through the in-band channel used by the call.

When an incoming PSTN call is received into the enterprise and deflected back to the PSTN, the PSTN needs two kinds of information to bridge the call and remove the PBX out of the call topology. The PBX needs to know the call reference (CRx number) of the calls involved in the call topology and the interface (the gateways) on which these calls exist. When PBX realizes it no longer needs to be involved in the call, it sends the bridging request on one leg of the call and information about the call and the interface on another leg. More specifically, a mechanism is provided to trigger TBCT (Two B-Channel Transfer) from the SIP server thereby pushing call routing of unwanted calls out of the PBX and preserving PBX ports for calls that should terminate in the enterprise.

Note additionally that, if any back-to-back agent proxy is involved then the proxy can also derive the call topology from its internal resource system.

In support thereof, the architecture disclosed and claimed herein comprises a system that facilitates call management. The system includes a routing component for receiving a multimedia message (e.g., a phone call) from a switched circuit network (e.g., the PSTN) for termination in an enterprise, and a session component for receiving message information (e.g., call IDs) about the multimedia message and signaling the routing component with a routing signal to route the multimedia message outside the enterprise based on the message information.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
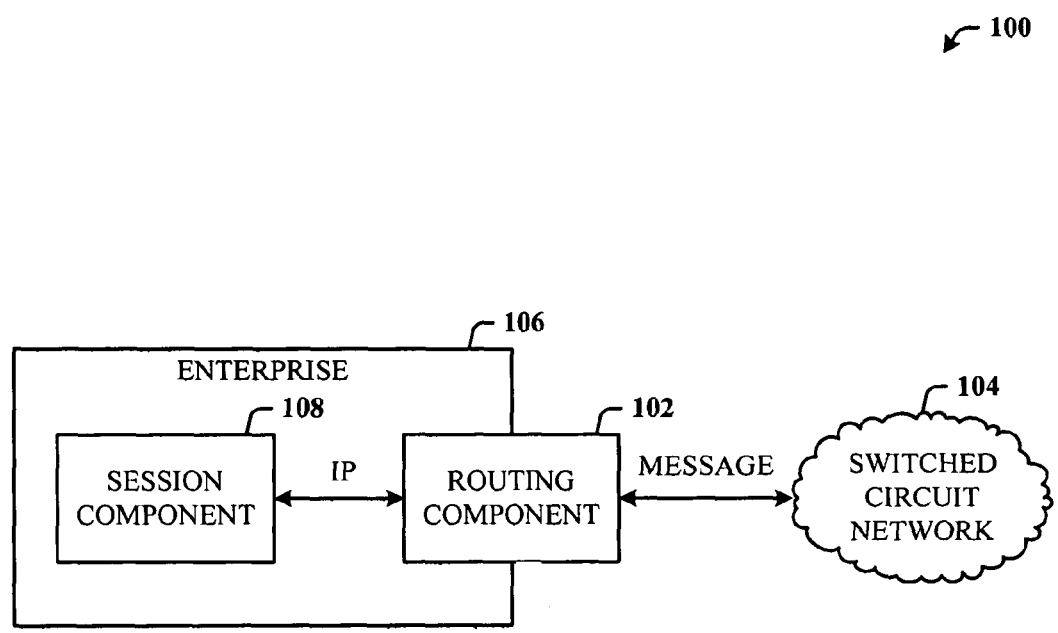
FIG. 1 illustrates a system that facilitates message management by bridging unwanted messages back to the PSTN in accordance with the subject architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

When bridging calls, the decision to initiate bridging should reside with the entity that has knowledge about the call topology. Prior to SIP (session initiation protocol)-based VoIP (voice-over-IP), this knowledge resided with the PBX (private branch exchange), since PBX had knowledge of every line defined in the enterprise and was well aware of every call topology. This made the PBX the ultimate decision maker, and all standards (e.g., GR2865) addressed this issue by using the PBX as the means to initiate bridging. In other words, when the PBX realized that a call does not belong to the enterprise, it issued a bridging request to the PSTN to bridge the call in the PSTN, thereby taking the PBX out of the call topology and releasing its resources for use by other users.

In IP-based systems such as to support VoIP, for example, call topology information resides with the SIP server. However, although actual call topology knowledge is with the SIP proxy server, PSTN call information is with the PBX. Therefore, the PBX system cannot be the decision maker. In fact, in conventional VoIP/PBX infrastructures, neither the PBX system nor the SIP server can initiate the bridging request.

The disclosed architecture facilitates more efficient port usage in an enterprise telephone IP-based system that includes a PBX by triggering bridging from the SIP server and redirecting unwanted calls out of the enterprise call system back to the PSTN thereby freeing up originally allocated PBX ports for other uses. Once the SIP server obtains the call information, it can form and transmit the necessary signal to trigger bridging in the PSTN.

Referring initially to the drawings, FIG. 1 illustrates a system 100 that facilitates message management by bridging unwanted messages back into the PSTN in accordance with the subject architecture. The system 100 includes a routing component 102 for receiving a multimedia message from a switched circuit network 104 for termination in an enterprise 106. The system 100 can also include a session component 108 for receiving message information about the multimedia message and signaling the routing component 102 with a routing signal to route the multimedia message outside the enterprise 106 based on the message information. As defined herein, the multimedia message can include one or more of audio (as in a voice call), text, video, images, and graphics, for example. In other words, one form of the multimedia message is a telephone call. Another form can be a text message, while another form can be a message that includes text, audio and video, and so on.

In one implementation, the session component 108 can be a SIP-based server and the routing component 102 can be a PBX. In operation, the message is originated from a client of the network 104 for routing through the routing component 102 to a recipient in the enterprise 106 causing the allocation of one or more ports for routing the message to the enterprise recipient. However, if the intended recipient is not in the enterprise to receive the message, but outside the enterprise at another location, the message should be routed outside the enterprise to the desired location, without tying up enterprise system resources. Accordingly, there is no reason to tie up allocated ports in the enterprise for the message. To resolve this problem, once received at the routing component 102, the SIP-based server obtains information about the message and intended recipient and sends a signal to the routing component 102 to route the message outside of the enterprise system, allowing release of the ports for enterprise use.

Figure 2:
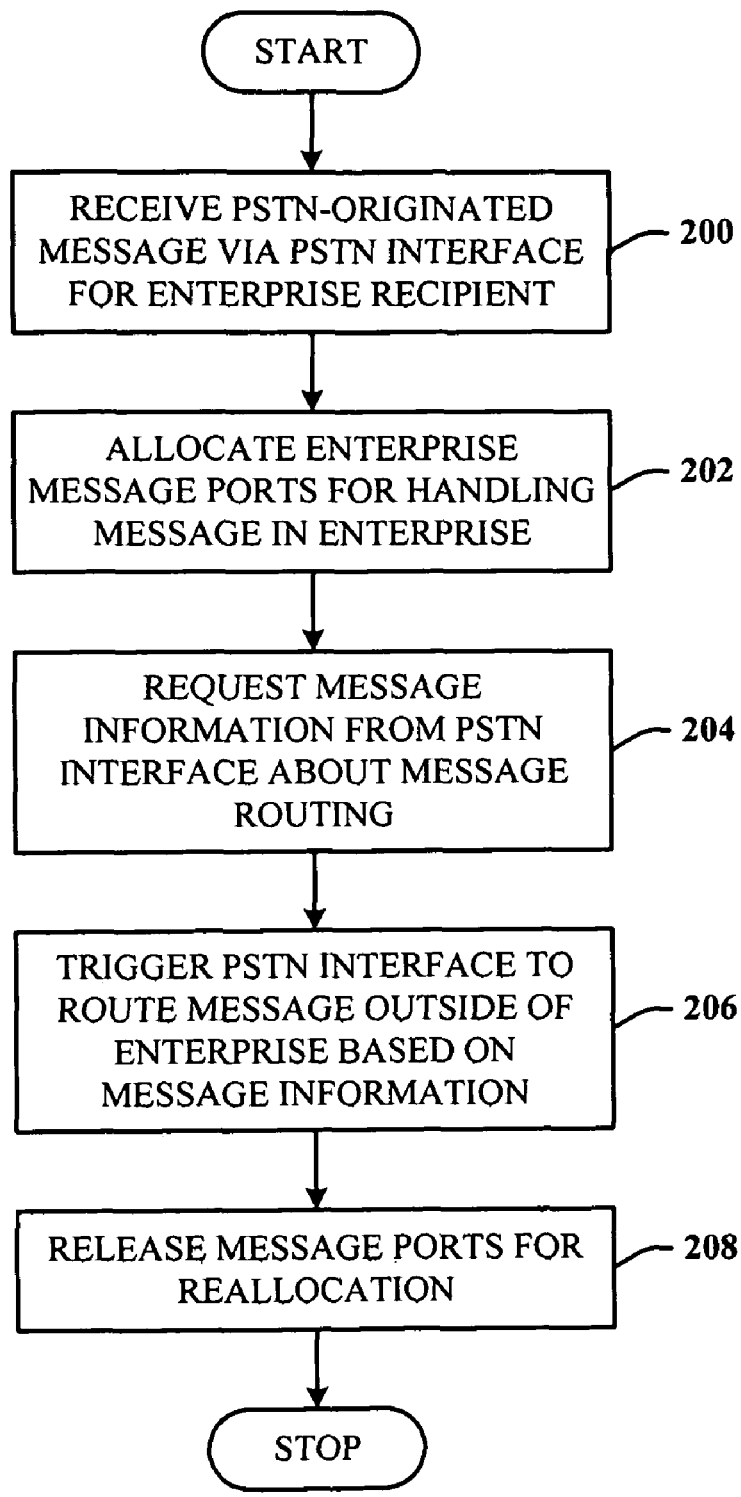
FIG. 2 illustrates a methodology of managing messages by redirecting the messages back into the PSTN for bridging.

FIG. 2 illustrates a methodology of managing messages by redirecting the messages back into the PSTN for bridging. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a PSTN-originated message is received via a PSTN interface destined for an enterprise recipient. At 202, message ports are allocated in the enterprise system for handling of the message. Where the message is a telephone call, for example, two ports can be allocated in the enterprise system. At 204, message information related to routing of the message is requested from the PSTN interface. The PSTN interface can be a carrier switch (e.g., captive office), for example. At 206, the PSTN interface is triggered to bridge (or route) the message outside the enterprise to a client device, for example, based on the message information. At 208, once routed outside the enterprise, the enterprise ports are then released for reallocation.

In a more specific example, the PSTN-originated message is a phone call that is directed by a caller to a recipient of the enterprise. When received at the enterprise, the enterprise system (e.g., including a media server and PBX) allocates two ports for call processing. According to rules related to the call or call recipient, for example, it becomes known that the call should be routed to a destination (or terminated) outside of the enterprise. This can be because the intended recipient is currently not at the enterprise location, but has implemented one or more call rules that when processed request that any incoming calls be routed elsewhere such as the actual location of the recipient. It is the goal to complete the call connection, but also to release the allocated enterprise ports, since the call is not being processed for enterprise purposes.

In a VoIP-capable enterprise telecom system, the PSTN-originated call is converted into a digital call for routing in the enterprise. Learning that the call should be redirected outside the enterprise, a SIP server requests call information from the PSTN about the call that indicates where the call is currently being connected and where the call should currently be routed. Once received, the SIP server sends a signal to the PSTN to bridge the call in the PSTN, rather than through the enterprise system, thereby allowing the release of the previously allocated enterprise call ports.

Figure 3:
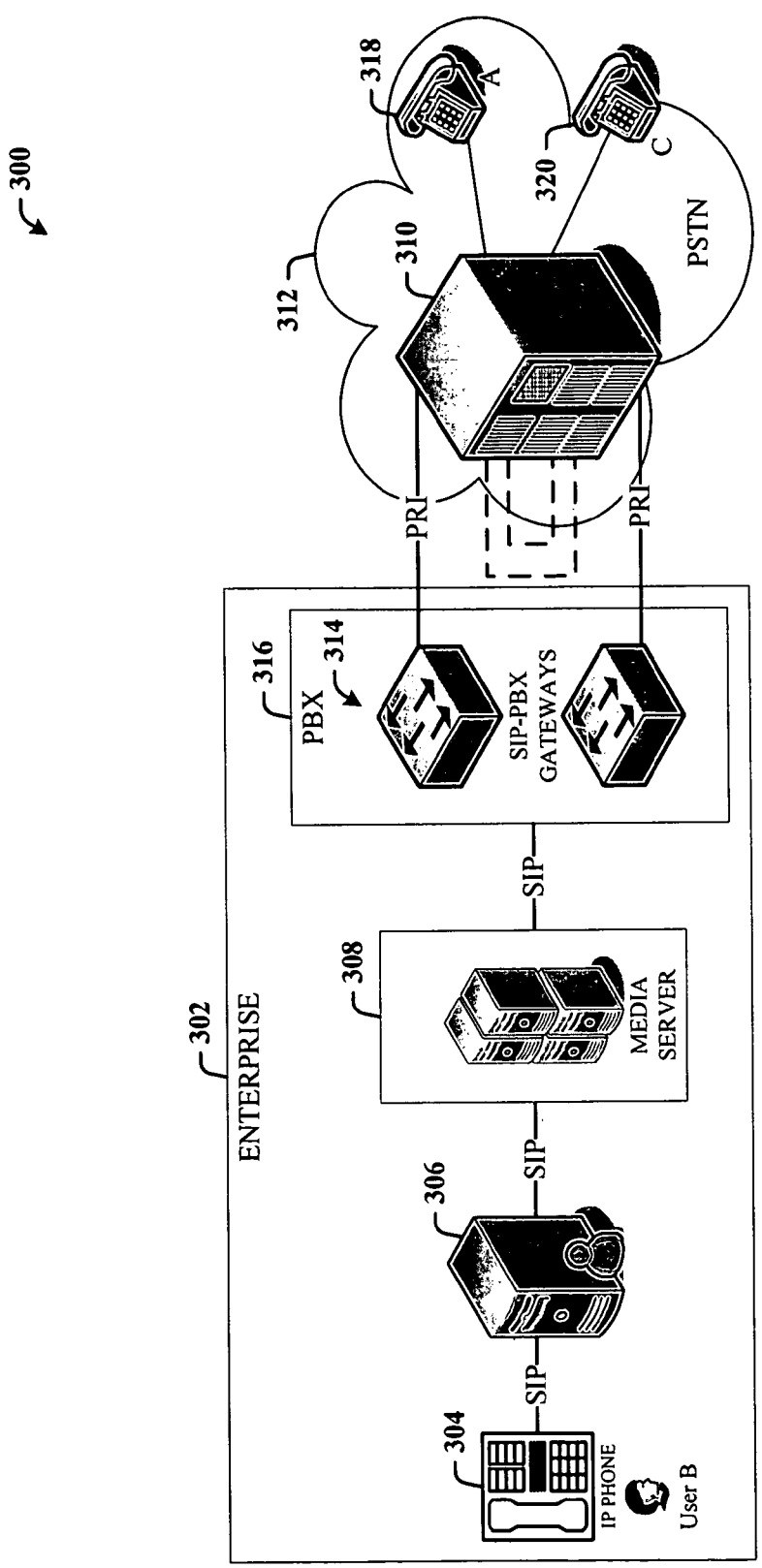
FIG. 3 illustrates a detailed system for telephone call handling in accordance with the disclosed architecture.

FIG. 3 illustrates a detailed system 300 for telephone call bridging in accordance with the disclosed architecture. The system 300 includes an enterprise system 302 for handling enterprise telecommunications for a corporation, for example. With the emerging implementations of digital telephone communications, companies are requesting that their infrastructures accommodate IP-based phone call processing, such as for VoIP. Accordingly, the enterprise 302 can include an IP phone 304 for processing IP calls. In support thereof, SIP can be employed by employing a SIP server 306 (e.g., a proxy server) that interfaces to the IP phone 304 to provide SIP functionality.

The enterprise 302 can also include a media server 308 as an IP-based call processing and handling device. The media server 308 can also provide IP-based call services such as interactive voice recording (IVR), conferencing (or bridging), speech recognition, and announcements, for example. The enterprise system 302 interfaces to a carrier switch system 310 (e.g., captive office) of the PSTN 312 via one or more SIP-PBX gateways 314. Here, the gateways 314 are shown as part of a PBX 316.

In operation, an incoming PSTN call from a PSTN phone 318 (shown as Phone A) is intended for enterprise User B (at the IP Phone 304), but the call is requested to be routed to a specified location outside the enterprise 302. The call can be diverted to a PSTN handset 320 (denoted C), for example. Ports originally allocated in the enterprise 302 to handle the call can then be released back into the pool for reallocation to later calls. This is an improvement over conventional systems that use two additional ports on the media server 308 and PBX 316 for all calls, even for calls deflected back to the PSTN 312.

Two kinds of information are utilized to bridge the call and release the PBX out of the call topology. The PBX needs to know the call reference (or call IDs) of the call involved in the call topology and the interface on which the call exists.

When PBX realizes it no longer needs to be involved in the call, it sends the bridging request on one leg of the call and information about the call and the interface on another leg. More specifically, a mechanism is provided to trigger TBCT (Two B-Channel Transfer) from the SIP server thereby pushing call routing of unwanted calls out of the PBX and preserving PBX ports.

Figure 4:
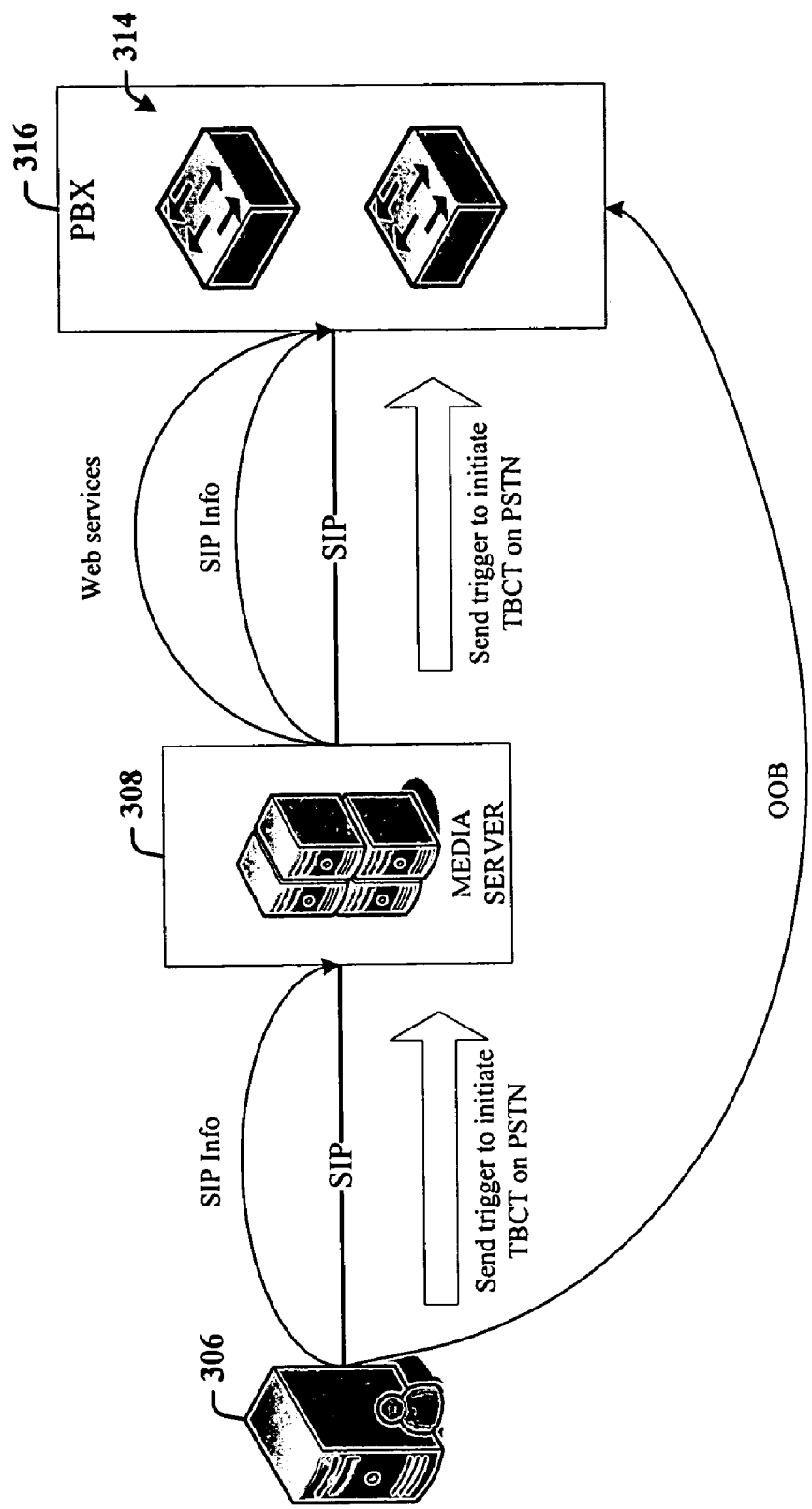
FIG. 4 illustrates three methods for obtaining PSTN-related information.

FIG. 4 illustrates three methods for obtaining PSTN-related call information. One method by which the SIP server 306 (e.g., proxy) can retrieve PSTN-related call details information is by using a SIP INFO message. A second method by which the SIP server 306 (e.g., proxy) can retrieve PSTN-related call details information is by using web services. A third method by which the SIP server 306 (e.g., proxy) can retrieve PSTN-related call details information is by an out-of-band (OOB) channel. OOB signaling can be performed on a dedicated channel other than the call by using Signaling System 7 (SS7), for example. SS7 is a set of telephony signaling protocols used to for telephony network signaling, messaging, interfacing and maintenance via service switching points, signal transfer points and service control points. Another protocol One or more of these three methods can be used to release all enterprise ports out of the call topology.

When using a SIP INFO message, this scenario assumes the media server 308 exists in the topology and uses a back-to-back user agent. However, in many other topologies, use of the media server 308 is optional. When using the OOB method, the SIP server can communicate directly to the SIP-PBX gateway of the PBX 316. When using the web services method, the media server 308 can obtain the call details information from the PBX 316. Once received and processed by the SIP server 306, the SIP server 306 sends the trigger to initiate TBCT in the PSTN.

Figure 5:
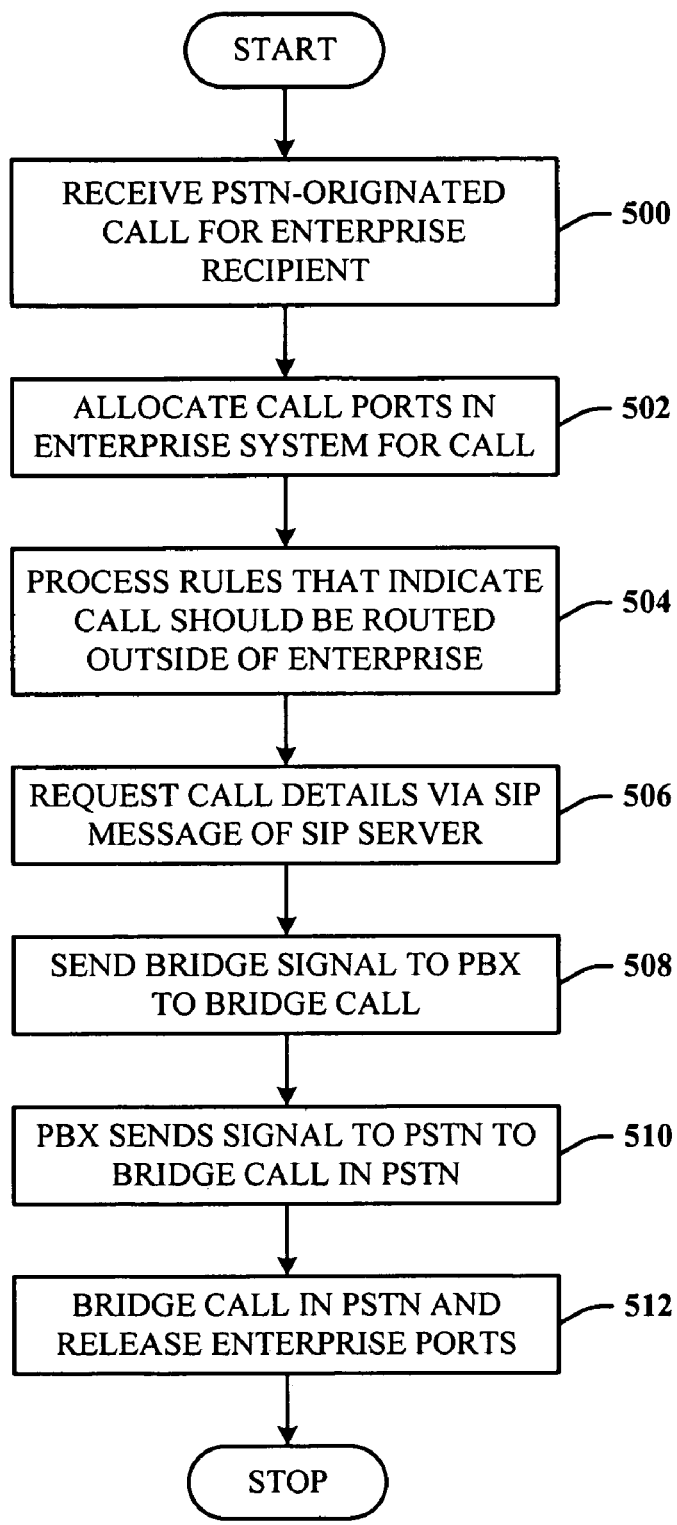
FIG. 5 illustrates a methodology of retrieving call details information via a SIP message.

FIG. 5 illustrates a methodology of retrieving call details information via a SIP message. At 500, a PSTN-originated call is received at the enterprise telephony system. At 502, enterprise call ports are allocated for the call. At 504, one or more rules are processed in the enterprise indicating that the call should be routed externally. At 506, call details are requested by the SIP server using a SIP INFO message. At 508, a bridge signal is sent from the SIP server to the PBX. At 510, the PBX sends the signal to the PSTN to bridge the call in the PSTN. At 512, the PSTN bridges the call, and the enterprise releases the previously allocated ports.

Figure 6:
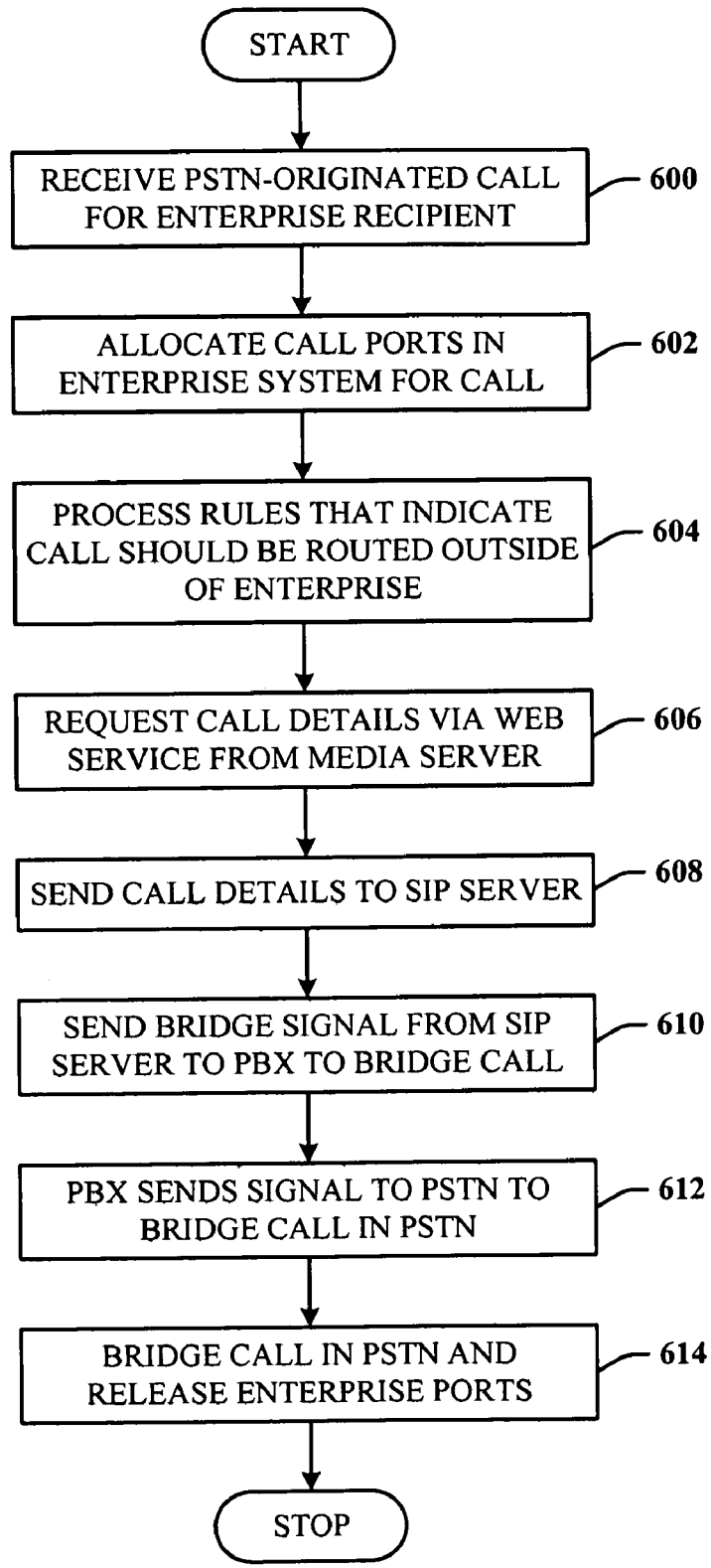
FIG. 6 illustrates a methodology of retrieving call details information via a web service.

FIG. 6 illustrates a methodology of retrieving call details information via a web service. At 600, a PSTN-originated call is received at the enterprise telephony system. At 602, enterprise call ports are allocated for the call. At 604, one or more rules are processed in the enterprise indicating that the call should be routed externally. At 606, call details are requested by the SIP server using the media server to access a web service. At 608, the media server sends the call details to the SIP server. At 610, a bridge signal is sent from the SIP server to the PBX. At 612, the PBX sends the signal to the PSTN to bridge the call in the PSTN. At 614, the PSTN bridges the call, and the enterprise releases the previously allocated ports.

Figure 7:
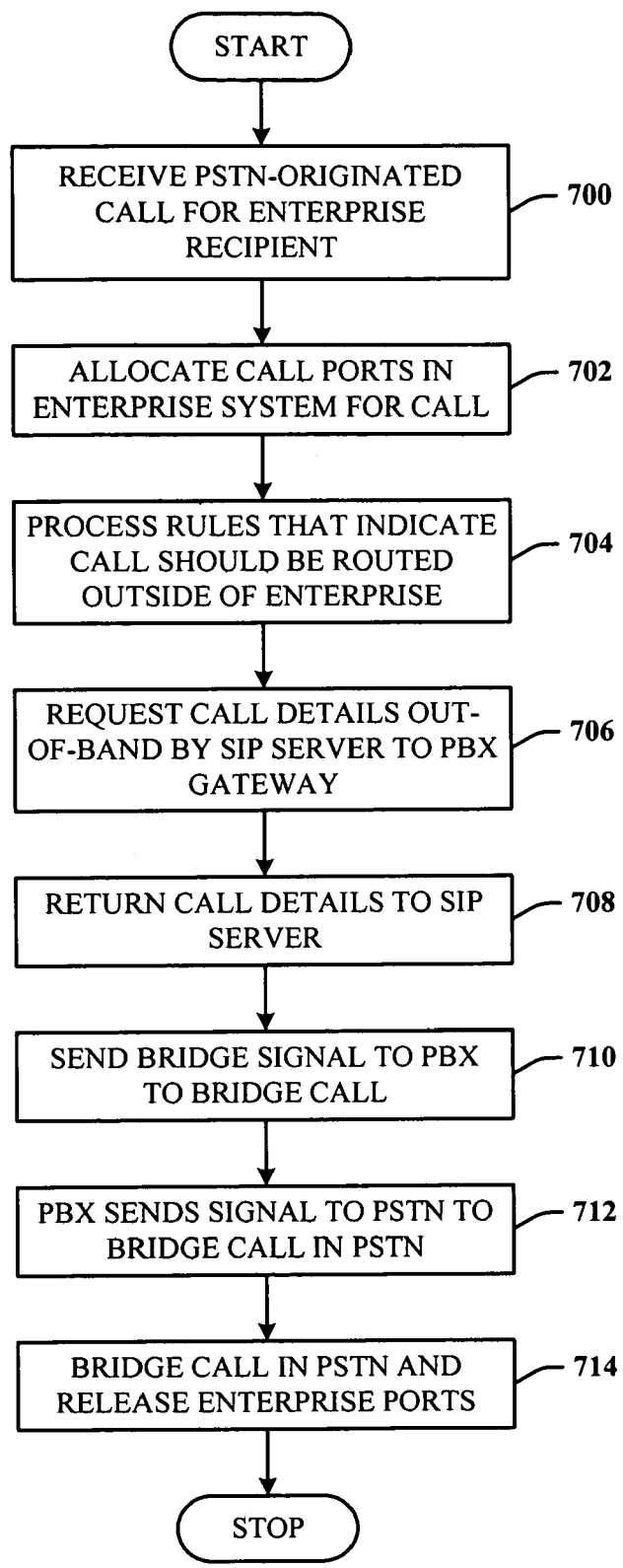
FIG. 7 illustrates a methodology of retrieving call details information via an out-of-band signal.

FIG. 7 illustrates a methodology of retrieving call details information via an out-of-band signal. At 700, a PSTN-originated call is received at the enterprise telephony system. At 702, enterprise call ports are allocated for the call. At 704, one or more rules are processed in the enterprise indicating that the call should be routed externally. At 706, call details are requested by the SIP server directly from the PBX gateways using out-of-band signaling. At 708, the call details are returned to the SIP server. At 710, a bridge signal is sent from the SIP server to the PBX. At 712, the PBX sends the signal to the PSTN to bridge the call in the PSTN. At 714, the PSTN bridges the call, and the enterprise releases the previously allocated ports.

Figure 8:
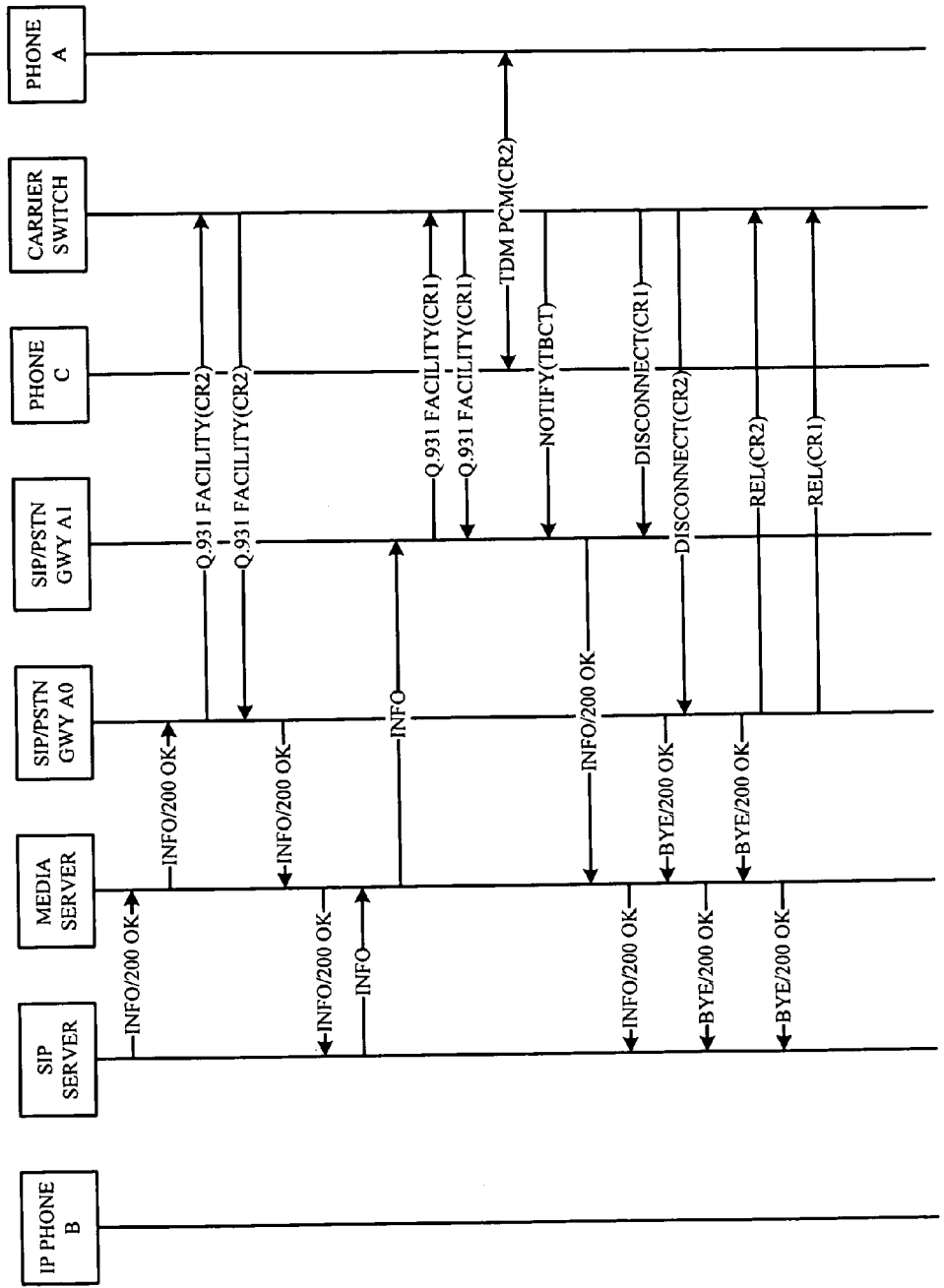
FIG. 8 illustrates a call flow diagram for redirecting calls in accordance with the disclosed architecture.

FIG. 8 illustrates a call flow diagram for redirecting calls in accordance with the disclosed architecture. Here, the enterprise receives a call from PSTN caller A (denoted PHONE A) that wishes to reach user B (denoted PHONE B) in the enterprise. A SIP proxy server (SIP SERVER) determines that this call needs to be redirected back into the PSTN to caller C (PHONE C) based on the rules and reachability configured on the SIP proxy server. As shown, at the end of successful call termination, a media path starts from user A to PBX/media server and terminates from the PBX/media server back into the PSTN to user C.

Thus, the PBX/media server carries media for a call that is no longer part of the enterprise. The SIP proxy server knows that the call is no longer required in enterprise. This enables the SIP proxy server to request PSTN call information via the SIP-PBX Gateway. The SIP-PBX gateway sends a request to the PSTN. The PSTN determines the call details and responds back to SIP-PBX gateway. The SIP-PBX gateway then forwards the PSTN call information to the SIP proxy server. The SIP proxy server sends a bridge request to the PBX with the received PSTN call information. The PBX, in turn, forwards this request to the PSTN, and the PSTN bridges the call, thereby releasing ports on the PBX and/or media server.

The Q.931 protocol is utilized to send facility messages between the gateways and the carrier switch to obtain the call information and to bridge the call into the PSTN. Q.931 is an ISDN (integrated services digital network) connection control protocol. ISDN specifies a BRI (basic rate interface) standard interface and a PRI (primary rate interface) standard interface. Q.931 is a powerful message oriented signaling protocol in the PRI, and makes it possible to interwork PBX features with features of the PSTN. The Q.931 protocol also enables the use of B-channels (voice and data channels) and out-of-band call control.

In a more specific description that includes message data, flow begins with the SIP server sending a SIP INFO (parameters)/200 OK message to the media server, where the parameters are (XML: Request PSTNCallDetails, Hdr: Incoming, ID2, From: MS-Tag, To: B). The media server sends a SIP INFO (parameters)/200 OK message to the SIP/PSTN gateway A0, where the parameters are (XML: Request PSTNCallDetails, ID3, From: MS-Tag, To: C). The gateway sends a Q.931 Facility (parameters) message to the carrier switch, where the parameters include (CR2, dCl Request). CRx is a call reference, is the call information that identifies a call, and can be particularly important for hold and retrieve operations. The carrier switch returns a Q.931 Facility (parameters) message to the gateway A0, where the parameters include (CR2, ReturnResult-dlcild). The gateway A0 sends a SIP INFO (parameters)/200 OK message to the media server, where the parameters include (XML: CallRef2, dlcild). The media server then sends a SIP INFO (parameters)/200 OK message to the SIP server, including the same parameters (XML: CallRef2, dlcild). The SIP server now has the knowledge of the call information needed to control bridging of the call back into the PSTN.

Accordingly, the SIP server then sends a SIP INFO (parameters) message back to the media server, where the parameters include (XML:Bridge, XML:dlcild, CallRef2, XML:Outgoing, id2, From: MS-Tag, To: B). The media server forwards a SIP INFO (parameters) message to a SIP gateway A1, where the parameters include (XML:Bridge, XML:dlcild, CallRef2, XML:Outgoing, id1, From: MS-Tag, To: A). The gateway A1 sends a Q.931 Facility (parameters) message to the carrier switch to bridge the call, where the parameters include (Ct1, EnhancedExplicitEctExecute, dlcild, CR1). The carrier switch returns a Q.931 (parameters) message back to the gateway A1, where the parameters include (CR1, ReturnResult). Call routing has now been completed between the PSTN-originated call and the recipient, who is external to the enterprise system. This is represented by the TDM PCM (pulse code modulation) flow between Phone A and Phone C, where the parameter passed is CR2.

Now, the originally-allocated ports need to be released. The carrier switch sends a Notify (parameters) message to the gateway A1, where the parameters include (TBCT, Successful). The gateway A1 sends a SIP INFO (parameters)/200 OK message to the media server, where the parameters include (Success/Fail). The media server forwards the SIP INFO (Success/Fail)/200 OK message to the SIP server. The carrier switch sends a Disconnect(CR1) message to the gateway A1, followed by a Disconnect(CR2) message to the gateway A0. A Bye(id1)/200 OK message is sent from the gateway A0 to the media server, which sends a Bye(id2)/200 OK message to the SIP server. Similarly, a Bye(id3)/200 OK message is sent from the gateway A0 to the media server, which sends a Bye(id2)/200 OK message to the SIP server. The gateway A0 then sends release messages Rel(CR2) and Rel(CR1) to the carrier switch.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
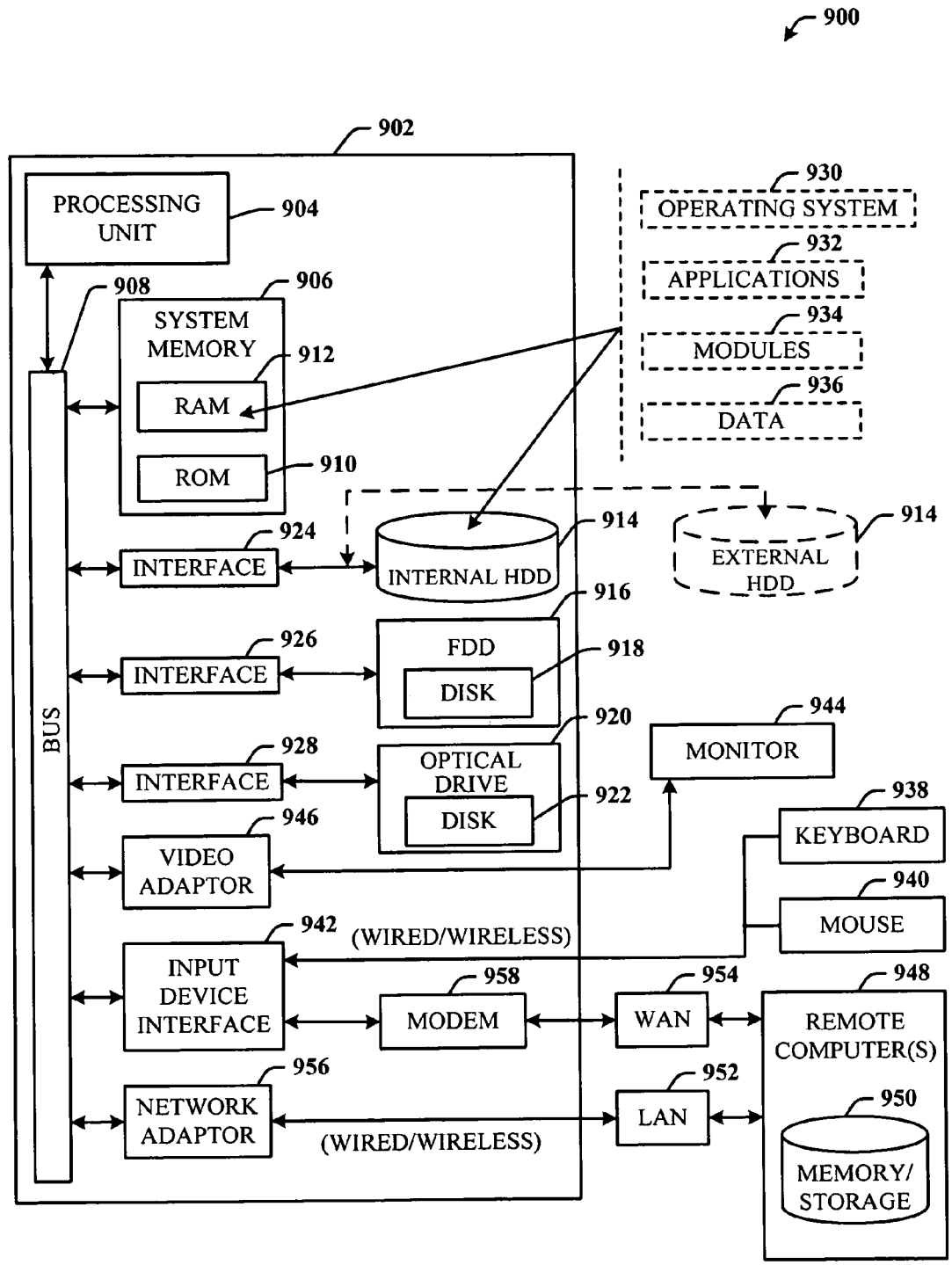
FIG. 9 illustrates a block diagram of a computing system operable to execute the disclosed message bridging architecture.

Referring now to FIG. 9, there is illustrated a block diagram of a computing system 900 operable to execute the disclosed message bridging architecture. More specifically, all or portions of the computing system 900 can be employed as the SIP server, the media server, and/or the SIP-PBX gateways, for example. Accordingly, requesting of call information and triggering of the bridging function can be initiated using the computing system 900.

In order to provide additional context for various aspects thereof, FIG. 9 and the following discussion are intended to provide a brief, general description of a suitable computing system 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902, the computer 902 including a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed a's the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 10:
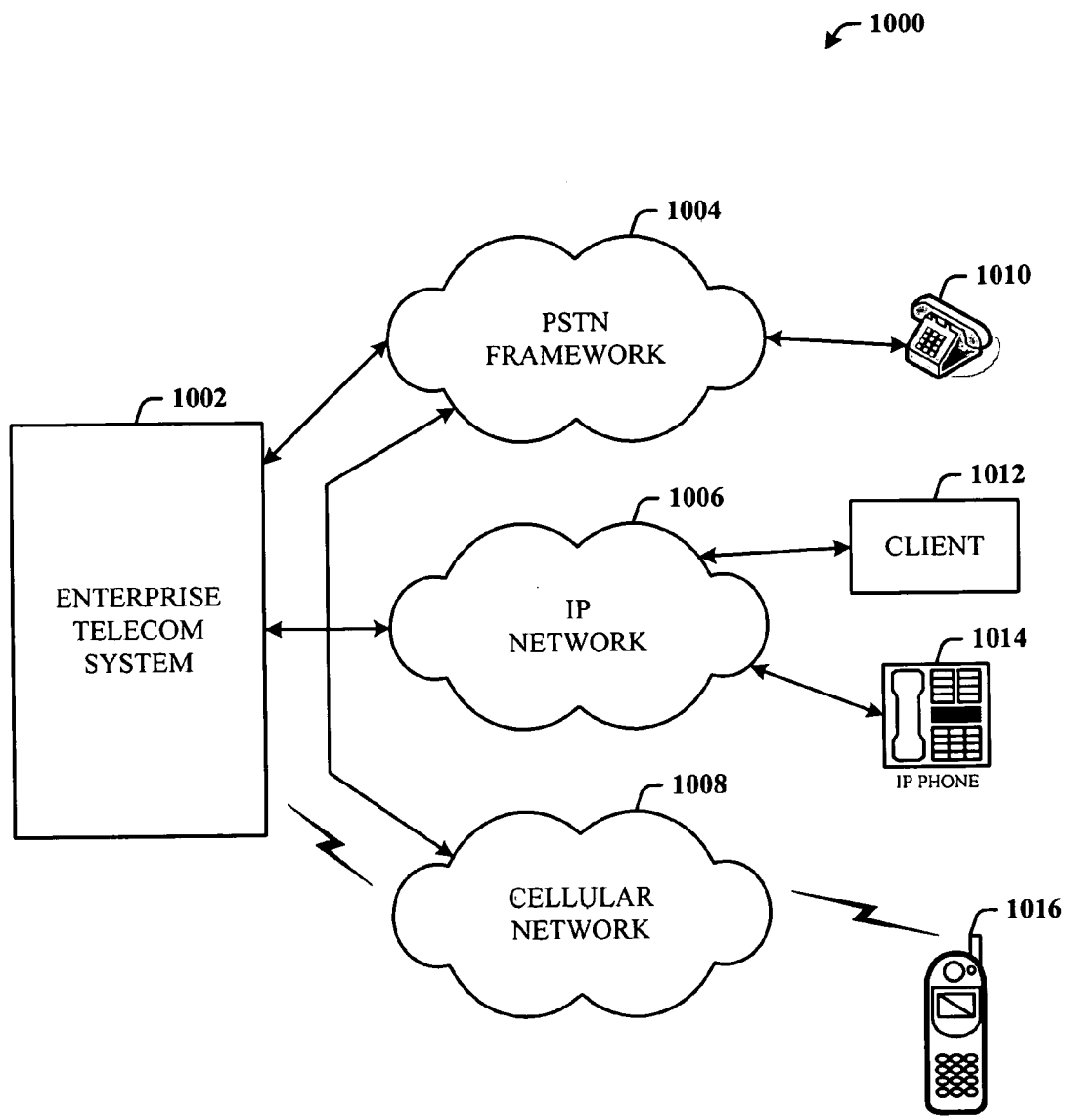
FIG. 10 illustrates a schematic block diagram of an exemplary telephony computing environment for message bridging in accordance with the subject innovation.

Referring now to FIG. 10, there is illustrated a schematic block diagram of an exemplary messaging communications environment 1000 for message bridging in accordance with the subject innovation. The system 1000 includes an enterprise telecom framework 1002 of a corporate enterprise. The telecom framework 1002 can interface to the PSTN 1004, an IP network 1006 (e.g., the Internet) and a cellular network 1008. A caller using a PSTN handset 1010 can connect through the PSTN 1004 to an intended recipient in the enterprise system 1002, and have the call redirected out of the enterprise and bridged at the PSTN to a client 1012 (e.g., a computer or similarly capable device) disposed on the IP network 1006. Similarly, the call form the handset can be redirected outside the enterprise to an IP phone 1014 disposed on the IP network 1006. In yet another example, the call can be bridged at the PSTN to a cellular phone 1016 in communications with the cellular network 1008.

The client 1012 can be hardware and/or software (e.g., threads, processes, computing devices), and can house cookie (s) and/or associated contextual information. The system 1000 also includes one or more server(s) 1004. One possible communication between the client 1012 and the cell phone 1016 can be in the form of a data packet adapted to be transmitted therebetween.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates call management, comprising:
   a routing component, which comprises a session initiation protocol (SIP) gateway on which message ports are initially allocated, for receiving a multimedia message via a public switched telephone network (PSTN) interface, the PSTN-originated message destined for an enterprise recipient of an enterprise for termination in an enterprise;
   a private branch exchange (PBX)/media server to request PSTN message information about the multimedia message from the PSTN interface related to routing of the message; and
   a session component for:
   sending a request for PSTN message information of the PSTN to a SIP PBX gateway, the SIP PBX gateway to forward the request to the PSTN, and the session component to receive the PSTN message information from the PSTN via the PBX/media server and,
   based on the message information, forwarding a bridge request to the routing component with a routing signal including the message information, the routing component operable to forward the routing signal to the PSTN interface to trigger bridging of the multimedia message in the PSTN rather than through the enterprise, by sending a routing signal from the PSTN interface to the PSTN to initiate a two B-channel transfer (TBCT) in the PSTN bridging the message in the PSTN, wherein the allocated message ports are subsequently freed up for reallocation based on routing of the message outside the enterprise.

2. The system of claim 1, wherein the routing component includes a session initiation protocol (SIP) gateway as an interface between the PSTN interface and the enterprise.

3. The system of claim 1, wherein the session component includes a SIP server for handling internet protocol (IP)-based messages.

4. The system of claim 1, wherein the multimedia message is a telephone call originated from a public switched telephone network (PSTN) caller.

5. The system of claim 1, wherein the routing component allocates a message port to handle the message and releases the port based on bridging of the message outside the enterprise.

6. The system of claim 1, wherein the routing component includes a private branch exchange (PBX) that forwards the routing signal, which is a TBCT signal, outside the enterprise to bridge the message in the PSTN.

7. The system of claim 1, wherein the session component is a SIP server that triggers bridging outside the routing component, which is a PBX, using a TBCT signal.

8. The system of claim 1, wherein the session component is a SIP server that requests call IDs associated with the message, and obtains the call IDs via one of a web service, an in-band SIP message, and an out-of-band request.

9. A method of managing messages, the method comprising acts of:
   receiving, via a public switched telephone network (PSTN) interface, a PSTN-originated message destined for an enterprise recipient of an enterprise;
   allocating message ports of a routing component in the enterprise for routing of the message in the enterprise;
   requesting, with a media server, PSTN message information from the PSTN interface related to routing of the message;
   sending a request for PSTN message information of the PSTN from a session initiation protocol (SIP) proxy server to a SIP private branch exchange (PBX) gateway;
   forwarding the request from the SIP PBX gateway to the PSTN, the SIP PBX gateway associated with a PBX;
   transmitting the PSTN message information from the PSTN to the SIP proxy server;
   based on the message information, forwarding a bridge request to the PBX including the message information;
   triggering the PSTN interface from the PBX to bridge the message in the PSTN rather than through the enterprise, by sending a routing signal from the PSTN interface to the PSTN to initiate a two B-channel transfer (TBCT) in the PSTN;
   bridging the message in the PSTN; and
   releasing the message ports for reallocation.

10. The method of claim 9, wherein the PSTN-originated message is a telephone call destined for an internet protocol (IP)-based client of the enterprise.

11. The method of claim 9, wherein the message information includes message reference information and interface data on which the message exists.

12. The method of claim 9, further comprising requesting the message information, which is PSTN-related information, via a web service.

13. The method of claim 9, further comprising requesting the message information, which is PSTN-related information, via an out-of-band channel.

14. The method of claim 9, further comprising requesting the message information, which is PSTN-related information, via a session initiation protocol (SIP) INFO message.

15. The method of claim 9, wherein a SIP proxy server requests the message information in the act of requesting and signals a private branch exchange (PBX) to facilitate bridging of the message back to a PSTN client.

16. A computer-implemented system, comprising:

computer-implemented means for receiving, via an enterprise interface, a public switched telephone network (PSTN)-originated telephone call destined for an enterprise recipient of an enterprise;

computer-implemented means for allocating call ports in a routing component for handling of the call in the enterprise;

computer-implemented means for requesting, with a media server, PSTN call information from the enterprise interface, the call information related to routing of the call;

computer-implemented means for sending a request for PSTN call information of the PSTN from a session initiation protocol (SIP) proxy server to a SIP private branch exchange (PBX) gateway;

computer-implemented means for forwarding the request from the SIP PBX gateway to the PSTN, the SIP PBX gateway associated with the routing component;

computer-implemented means for transmitting the PSTN call information from the PSTN to the SIP proxy server;

computer-implemented means for forwarding a bridge request to the routing component including the call information;

computer-implemented means for triggering the enterprise interface to bridge the call in the PSTN rather than through the enterprise, based on the call information, by sending a routing signal from the enterprise interface to the PSTN to initiate a two B-channel transfer (TBCT) in the PSTN; and computer-implemented means for releasing the call ports for reallocation.

* * * * *